US 6,711,953 B2

(12) United States Patent
Hayashi et al.

(10) Patent No.: US 6,711,953 B2
(45) Date of Patent: Mar. 30, 2004

(54) METHOD OF AND APPARATUS FOR CONTROLLING BEAMS PRODUCED BY A CYLINDRICAL TRANSDUCER (75) Inventors: Tatsuo Hayashi, Nishinomiya (JP); Shinji Ishihara, Nishinomiya (JP); Norio Matsuhiro, Nishinomiya (JP)

(73) Assignee: Furuno Electric Company, Ltd., Hyogo-ken (JP)

( * ) Notice: Subject to any disclaimer, the term of this patent is extended or adjusted under 35 U.S.C. 154(b) by 0 days.

(21) Appl. No.: 09/938,154

(22) Filed: Aug. 24, 2001

(65) Prior Publication Data
US 2002/0023497 A1 Feb. 28, 2002

(30) Foreign Application Priority Data
Aug. 25, 2000 (JP) ......................................... 2000-256193

(51) Int. Cl.[7] .............................................. G01N 29/26
(52) U.S. Cl. ............................ 73/626; 73/628; 73/633; 600/447
(58) Field of Search .......................... 73/625, 626, 627, 73/628, 632, 633, 641; 600/447; 367/12, 122, 123, 125, 103, 105, 153, 155

(56) References Cited

U.S. PATENT DOCUMENTS

| 3,697,937 | A | * | 10/1972 | Ingram | 367/25 |
| 4,001,763 | A | * | 1/1977 | Kits van Heyningen | 342/377 |
| 4,733,562 | A | | 3/1988 | Saugeon | 73/626 |
| 5,453,575 | A | * | 9/1995 | O'Donnell et al. | 600/463 |
| 5,549,638 | A | * | 8/1996 | Burdette | 310/322 |
| 5,640,371 | A | * | 6/1997 | Schmidt et al. | 367/153 |
| 5,921,931 | A | * | 7/1999 | O'Donnell et al. | 382/162 |
| 6,108,275 | A | * | 8/2000 | Hughes et al. | 310/334 |
| 6,310,832 | B1 | * | 10/2001 | Kits van Heyningen | 367/122 |

FOREIGN PATENT DOCUMENTS

| GB | 1509333 | 1/1976 |
| GB | 2357842 | 7/2001 |
| JP | 61205879 | 9/1986 |

* cited by examiner

*Primary Examiner*—Daniel S. Larkin
*Assistant Examiner*—Rose M. Miller
(74) *Attorney, Agent, or Firm*—Birch, Stewart, Kolasch & Birch, LLP (57) ABSTRACT In a cylindrical transducer constructed of a plurality of ultrasonic transducer arrays arranged in a circular form, the ultrasonic transducer arrays is divided into a plurality of groups, and tilt angles of transmitting and receiving beams are controlled to compensate for swing motions of the cylindrical transducer depending on which group the individual ultrasonic transducer arrays belong. Provided that the uncompensated tilt angle of the beam is a and the angle of inclination of the cylindrical transducer in a particular direction is b, the tilt angle of the beam formed by a transducer array in the inclining direction should be adjusted to $\alpha-\beta$ and the tilt angle of the beam formed by a transducer array in the opposite direction should be adjusted to $\alpha+\beta$.

6 Claims, 8 Drawing Sheets

METHOD OF AND APPARATUS FOR CONTROLLING BEAMS PRODUCED BY A CYLINDRICAL TRANSDUCER

BACKGROUND OF THE INVENTION AND RELATED ART STATEMENT

The present invention relates to a method of and an apparatus for controlling the direction of transmitting and receiving beams produced by a cylindrical transducer used in an ultrasonic fish-finding apparatus.

A sonar system like an ultrasonic fish-finding apparatus is usually installed on a vessel which rolls and pitches in operation. A transducer of the sonar system swings with pitching and rolling motions of the vessel. A fish-finding apparatus is a device which transmits ultrasonic pulses from a transducer, receives return echoes reflected by underwater targets such as fish schools, and visualizes the received echoes on a display screen. Accordingly, if the transducer swings under the influence of the pitching and rolling of the vessel, an on-screen picture also sways in synchronism with the swing motion of the transducer, making it impossible to determine the direction or depth of a target. It might even be impossible to obtain target echoes on the screen if the swing motion is extremely severe.

Under this circumstance, it has long been desired to develop a beam-stabilizing control method which makes it possible to cancel out the influence of swing motion and constantly form transmitting and receiving beams in desired directions such that underwater targets including fish schools can be located in a stable fashion regardless of pitch and roll of a vessel.

Such a beam-stabilizing control method has not been developed yet however. A main reason for this is as follows. If it is intended to just tilt a beam produced by a cylindrical transducer formed of transducer elements arranged in rows and columns by conventional technology, it is only necessary to control the phases of carrier signals of the individual rows of the transducer elements. In order to stabilize the beam against the swing motion (rolling and pitching), however, it is necessary to control the carrier phase of each transducer element in the individual rows, and this requires the same number of phase control circuits as the number of the entire transducer elements. If the cylindrical transducer is formed of 20 rows of 30 elements arranged in a ringlike form, for example, a total of 600 phase control circuits are needed. The beam-stabilizing method has not been developed yet despite a pending demand, because it results in complication and a significant increase in the physical size of hardware.

Although the duration of each transmitting pulse is extremely short compared to the period of a vessel's pitching and rolling (swing motion of a transducer), reception of return echoes is a noticeably time-consuming process. Provided that a sonar system is operated on a 3000 m range, for example, reception of return echoes derived from a single transmitting pulse takes approximately 4 seconds. Since pitch and roll angles continuously vary during this period, it is necessary to restabilize the beam to compensate for the varying pitch and roll angles during the reception of echo signals. If the tilt angle is varied during the reception of echo signals, however, continuity of the phase of the echo signals is lost at the point of change in the tilt angle, and this results in an inability to produce a beam properly.

SUMMARY OF THE INVENTION

In view of the foregoing, it is an object of the invention to provide a method of and an apparatus for stabilizing the direction of transmitting and receiving beams produced by a cylindrical transducer by compensating for swing motion of the beams due to pitching and rolling of a vessel with a simple construction.

According to the invention, a method of controlling the direction of a transmitting beam and a receiving beam formed by a cylindrical transducer which is constructed of a plurality of ultrasonic transducer arrays arranged in a circular form comprises the steps of dividing the ultrasonic transducer arrays in a plurality of groups, and controlling the direction of the beams formed by the ultrasonic transducer arrays depending on which group the individual ultrasonic transducer arrays belong.

In one aspect of the invention, the phases of carrier signals fed into individual elements of the ultrasonic transducer arrays are controlled depending on which group the ultrasonic transducer arrays belong.

Let us now assume that the cylindrical transducer forms a beam having a full-circle umbrellalike pattern directed obliquely downward by a tilt angle a. If the cylindrical transducer is inclined by the angle of inclination b in a particular direction due to pitching and rolling of the vessel, the inclination of the beam in that direction becomes $\alpha+\beta$ while the inclination of the beam in the opposite direction becomes $\alpha-\beta$, making it impossible to sound underwater situations with a uniform tilt angle in all directions. To compensate for the inclination of the cylindrical transducer, the tilt angle of the beam formed by the cylindrical transducer is adjusted to $\alpha-\beta$ in its inclining direction and the tilt angle of the beam is adjusted to $\alpha+\beta$ in the opposite direction. If the tilt angle of the beam is corrected in this manner, it is possible to sound the underwater situations with a uniform tilt angle a in all directions regardless of the inclination b of the transducer. A cylindrical transducer typically includes 20 to 30 vertical transducer arrays arranged in a circular form. This structure of the cylindrical transducer may be regarded, in other words, as vertically stacked ringlike arrays, each including 20 to 30 ultrasonic transducer elements. Controlling the phases of carrier signals fed into the individual transducer elements results in considerable complication in hardware configuration. To avoid this inconvenience, the vertical transducer arrays arranged in the circular form are divided into multiple groups and the direction of the beams are controlled depending on which group the individual transducer arrays belong in this invention. This approach makes it possible to stabilize the beams with required accuracy by use of a least complicated configuration.

According to the context of this invention, the cylindrical structure of the transducer as claimed in the appended claims includes not only a circular cylinder but also other shapes, such as truncated circular cones, whose top and bottom have different diameters.

In another aspect of the invention, the aforementioned step of controlling the direction of the beams includes the steps of detecting the angle of inclination of the cylindrical transducer, and controlling the direction of the beams formed by the ultrasonic transducer arrays of the individual groups to compensate for the angle of inclination of the cylindrical transducer.

Since the cylindrical transducer is fixed to the bottom of the vessel, it swings in accordance with pitching and rolling motions of the vessel. If a sensor for detecting the angle of inclination of the cylindrical transducer is provided, it becomes possible to stabilize the transmitting and receiving beams by detecting the angle of inclination of the cylindrical transducer and controlling the direction of the beams to compensate for the angle of inclination of the cylindrical transducer.

Compared to the period of the vessel's pitching and rolling motions (which is at least one second), transmission pulse length is considerably short. It is possible to assume that there are no variations in the angle of inclination of the cylindrical transducer during a transmission cycle (where the transmission pulse length is 100 ms at the maximum) and, therefore, it is sufficient to compensate for the swing motion of the transmitting beam using the angle of inclination detected immediately before transmission. In other words, it is not necessary perform successive operations for compensating for the varying angle of inclination during each transmission cycle.

Operation during a reception cycle differs from that in the transmission cycle, however. Duration of the reception cycle is determined as a function of sounding range. Since the duration of the reception cycle is much longer than the transmission cycle, it is necessary to compensate for the varying angle of inclination of the cylindrical transducer during the reception cycle. If, however, the tilt angle of the receiving beam is simply varied during the reception cycle, the phase of the received echo signals is interrupted at the point of change in the tilt angle. This would result in inability to form a proper receiving beam or cause noise.

According to the invention, the direction of the receiving beam is controlled more than once during each reception cycle by rotating the transducer array surface about its "center of gravity." As a result of this operation, the echo signals received before and after the rotation of the transducer array surface can be regarded as a signal received at its center of gravity without any discontinuity of the phase.

In an active sonar like an ultrasonic fish-finding apparatus, the period of reception of echo signals is long compared to the period of the vessel's pitching and rolling motions. Thus, the direction of the receiving beam is varied more tan once during each reception cycle so that the beam direction follows the varying angle of inclination of the cylindrical transducer. If the center of rotation of the transducer array surface varies each time the beam direction is varied, however, the equiphase surface of the signals shifts back and forth in the beam direction, causing discontinuity of the phase. In this invention, the transducer array surface is rotated about a fixed point no matter in which direction the receiving beam is rotated. As a result, it is possible to continuously form a stable receiving beam even if the direction of the receiving beam is controlled, or varied, more than once during the reception cycle.

These and other objects, features and advantages of the invention will become more apparent upon reading the following detailed description in conjunction with the accompanying drawings.

BRIEF DESCRIPTION OF THE DRAWINGS

FIGS. 6A and 6B are diagrams showing

DETAILED DESCRIPTION OF THE PREFERRED EMBODIMENTS OF THE INVENTION

Figure 1:
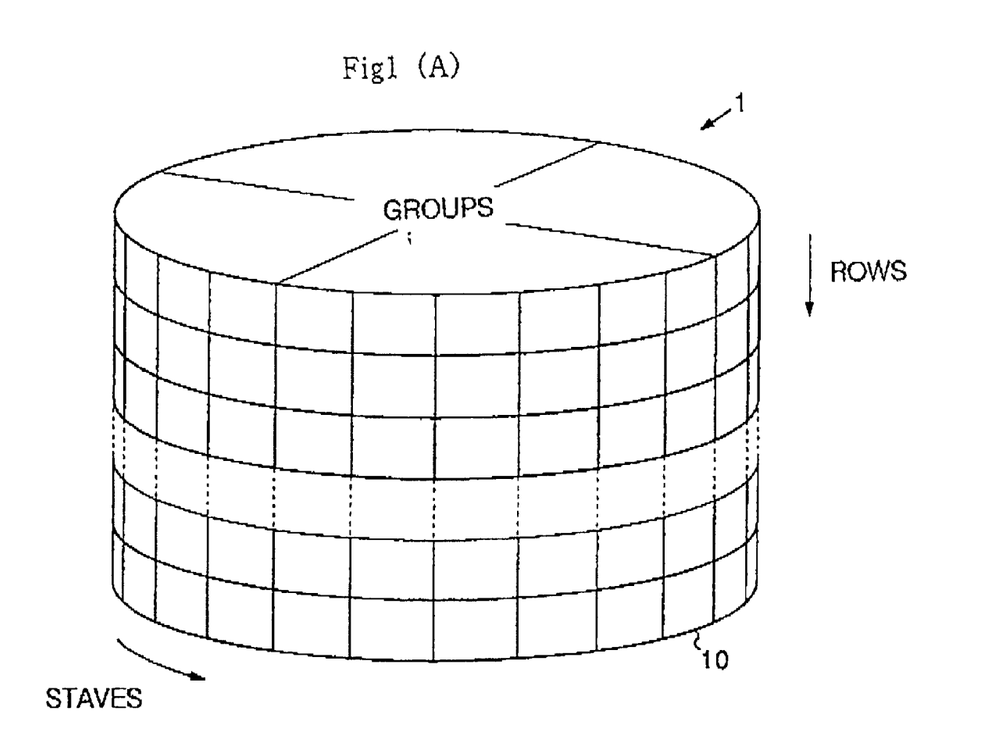
FIGS. 1A and 1B are diagrams schematically showing the construction of a transducer used in an ultrasonic fish-fining apparatus and a phasing scheme according to an embodiment of the invention, respectively.
Figure 2:
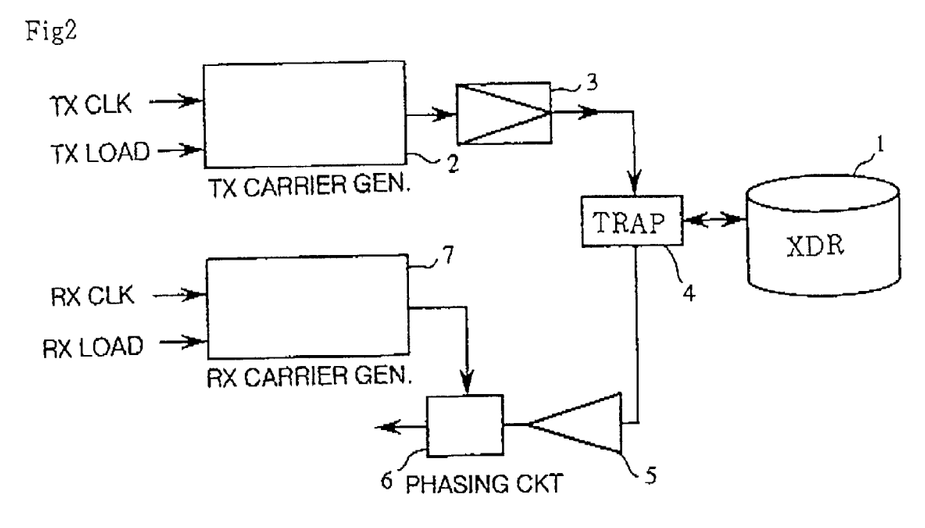
FIG. 2 is a block diagram of a transceiver of the ultrasonic fish-finding apparatus.

FIGS. 1A and 1B are diagrams schematically showing the construction of a transducer 1 used in an ultrasonic fish-fining apparatus and a phasing scheme according to an embodiment of the invention, respectively, and FIG. 2 is a block diagram of a transceiver of the ultrasonic fish-finding apparatus.

Referring to FIG. 1A, the transducer 1 includes 480 ultrasonic transducer elements 10 assembled into a cylindrical form. Specifically, 24 ultrasonic transducer elements 10 are arranged in a ringlike form and 20 layers, or rows, of such ringlike arrays of the 24 ultrasonic transducer elements 10 are stacked one on top of another as illustrated. The transducer 1 thus constructed may also be regarded as an assembly of cylindrically arranged 24 vertical transducer arrays (which may be hereinafter referred to as "staves") each including 20 ultrasonic transducer elements 10. Each of the ultrasonic transducer elements 10 is connected to a transmitter section and a receiver section of the transceiver through a trap 4 as shown in FIG. 2. In the transceiver which will be later described in detail, the ultrasonic transducer elements 10 in each row are divided into four groups including the elements 10 in stave Nos. 1–6, 7–12, 13–18 and 19–24.

The transmitter section and the receiver section respectively form a transmitting beam and a receiving beam, both of which are narrow in a vertical plane, by a combination of signals fed into or received through the ultrasonic transducer elements 10 vertically arranged in each column, or stave, of the transducer 1 (i.e., the ultrasonic transducer elements 10 of the same stave number in the individual rows. Generally, a vertically narrow beam can be formed by phasing signals fed into or received through a vertical array of transducer elements. In this embodiment, it is possible to direct the beam obliquely downward by progressively advancing the phase of signals for the ultrasonic transducer elements 10 of upper rows as shown in FIG. 1B. In a transmission cycle, signals thus phased are applied to the ultrasonic transducer arrays of all the stave numbers to transmit an ultrasonic pulse in all directions, wherein the transmitting beam has a vertically narrow full-circle umbrellalike pattern which is directed obliquely downward. In a reception cycle, received echo signals are combined for the individual ultrasonic transducer arrays using the phasing scheme as depicted in FIG. 1B to produce a vertically narrow receiving beam which is processed by a matched filter (not shown) in a later stage to produce a horizontally narrow receiving beam.

Referring to FIG. 2, the transducer 1 is connected to the transmitter section and the receiver section via the trap 4. The transmitter section includes a transmitting carrier generator 2 and a power amplifier 3 while the receiver section includes a preamplifier 5 a phasing circuit 6 and a receiving carrier generator 7. The trap 4 protects receiver circuitry from powerful transmitting signals and isolates the transmitter section so that received signals would not go into transmitter circuitry during the reception cycle. The transducer 1 transmits an ultrasonic pulse signal generated by the transmitting carrier generator 2 and amplified by the power amplifier 3 and receives resultant echo signals. The echo signals received by the transducer 1 are amplified by the preamplifier 5 and entered to the phasing circuit 6. The receiving carrier generator 7 supplies local canter signals for the individual transducer elements 10 to the phasing circuit 6 and the echo signals entered from the individual transducer elements 10 are mixed with these local carrier signals, whereby the phases of the echo signals are shifted. The local carrier signals are controlled differently for the individual groups of the ultrasonic transducer elements 10. The echo signals thus phased are delivered to the matched filter (not shown) through a bandpass filter (BPF) (not shown) in a later stage. The receiving beam is produced by the matched filter as stated earlier.

With a conventional transmitter, it is only possible to form a transmitting beam rotationally symmetric about a central axis of a cylindrical transducer, because the conventional transmitter simply controls the phase of an ultrasonic transmitting pulse applied to individual transducer elements of a cylindrical transducer for each row of the transducer elements. Also with a conventional receiver, it is only possible to form a receiving beam rotationally symmetric about the central axis of the cylindrical transducer, because the conventional receiver simply controls the phase of echo signals entered from the transducer elements of the transducer for each row of the transducer elements.

In the ultrasonic fish-finding apparatus of the present embodiment, the ultrasonic transducer elements 10 in each row are divided into groups as shown in FIG. 1A and signal phases are controlled differently for the individual groups even if the ultrasonic transducer elements 10 belong to the same row. It is therefore possible to form a beam which is not rotationally symmetric about a central axis of the cylindrical transducer 1.

Figure 3:
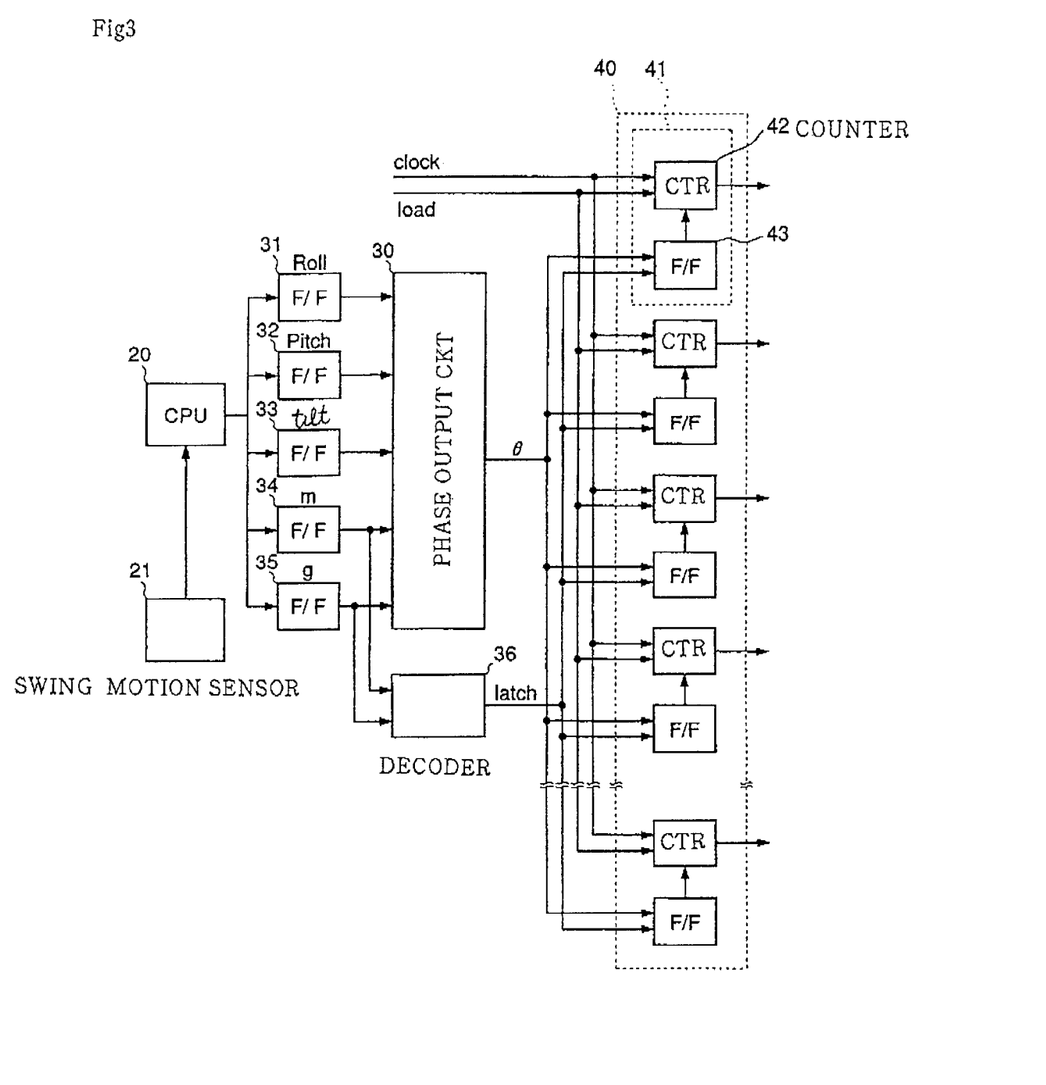
FIG. 3 is a block diagram of one of carrier generators provided in the transceiver.

Described below with reference to FIG. 3 is how the transmitting carrier generator 2 and the receiving carrier generator 7 perform the aforementioned beamforming operation. Each of these carrier generators 2, 7 is a circuit which determines a tilt angle to be achieved after compensation for each group of the ultrasonic transducer elements 10 depending on an uncompensated tilt angle and a vessel's pitching and rolling angles and generates phase-controlled carrier signals for the relevant ultrasonic transducer elements 10 for forming a beam of the desired tilt angle. The carrier signals generated by the transmitting carrier generator 2 are amplified by the power amplifier 3 and fed into the individual ultrasonic transducer elements 10 as ultrasonic pulse signals, while carrier signals generated by receiving carrier generator 7 are delivered to the phasing circuit 6 as local carrier signals and mixed with the echo signals entered rough the individual ultrasonic transducer elements 10.

As shown in FIG. 3, swing motion sensor (inclination sensor) 21 is connected to a central processing unit (CPU) 20 of the transceiver. The swing motion sensor 21 is a sensor for detecting the pitching and rolling angles of the vessel on which the ultrasonic fish-finding apparatus is installed. The CPU 20 enters the pitching and rolling angles, tilt angle, transducer group number g (=1 to 4) and row number m (=1 to 20) to five latch circuits (flip-flops) 31–35 provided in the carrier generator. Data latched by these latch circuits 31–35 are fed into a phase output circuit 30. Based on the pitching and rolling angles, tilt angle, transducer group number and row number, the phase output circuit 30 outputs carrier phase data for the relevant group of the ultrasonic transducer elements 10. The carrier phase data are numerical values from 0 to 127 representing angles from 0 to 2. The CPU 20 enters sequentially changed values expressed in the form of (row number A, group number g)=(1, 1) to (20, 4).

With this arrangement, the phase output circuit 30 outputs the carrier phase data for each group of the ultrasonic transducer elements 10 in the individual rows such that the transducer 1 installed on the vessel which rolls and pitches at specific pitching and rolling angles can produce a full-circle beam which is directed obliquely downward and rotationally symmetric about a vertical axis.

A decoder 36 of FIG. 3 outputs a latch pulse to one of carrier generating circuits 41 corresponding to the row number m and the group number g latched by the latch circuits 34, 35. The carrier generating circuit 41 includes counters 42 and latch circuits (flip-flops) 43. When the latch pulse is entered from the decoder 36, the latch circuits 43 latch the carrier phase data output from the phase output circuit 30 at that moment. The counters 42 count a clock signal whose frequency is 128 times the carrier frequency. The counters 42 start counting when a load pulse is entered. At the start of a counting process, the carrier phase data (a value from 0 to 127) latched by the latch circuits 43 is preset. Therefore, the counters 42 start counting from the preset value. The count value overflows at 128 and the counters 42 restart the counting process from 0. As a result of this counting process, a carrier signal whose phase is shifted by an amount determined from the carrier phase data is obtained.

After the carrier phase data has been set in all the carrier generating circuits 41, the load pulse is simultaneously entered to all the carrier generating circuits 41. A total of 80 carrier generating circuits 41 are provided for 20 rows by four groups of the ultrasonic transducer elements 10. This number (80) of the carrier generating circuits 41 is one-sixth of the number (480) needed when the carrier generating circuits 41 are provided for the individual ultrasonic transducer elements 10.

The phase output circuit 30 may be formed of a random-access memory (ROM) which stores carrier phase data corresponding to individual row numbers, group numbers, tilt angles, pitching and rolling angles or a digital circuit which calculates and outputs carrier phase data corresponding to these variables.

Referring again to FIG. 2, there are provided 80 phase output circuits 30 for 20 rows by four groups of the ultrasonic transducer elements 10 in this embodiment. The carrier signal appropriate for the row and group (m, g) to which the specific ultrasonic transducer elements 10 belong is entered to each these phase output circuits 30.

Although FIG. 2 shows one each preamplifier 5 and phasing circuit (mixer) 6, there are provided 480 each preamplifiers 5 and phasing circuits 6 for the 480 ultrasonic transducer elements 10 in this embodiment. The carrier signal for the row and group (m, g) to which the specific ultrasonic transducer elements 10 belong is input to each phasing circuit 6.

Figure 4:
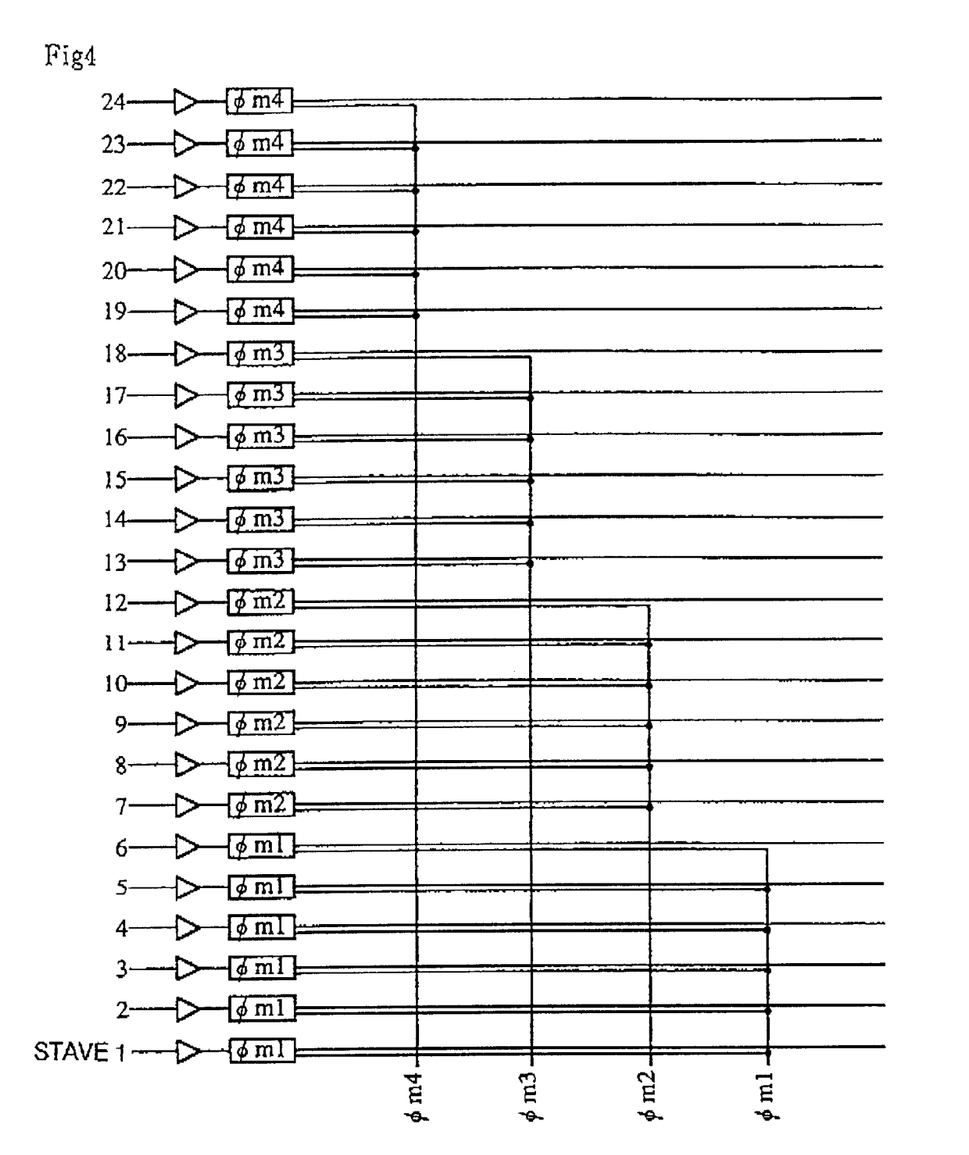
FIG. 4 is a circuit configuration diagram showing part of phasing circuits provided in the transceiver.

FIG. 4 shows part of groups of the preamplifiers 5 and phasing circuits 6. Echo signals received by the individual ultrasonic transducer elements 10 are amplified by the preamplifiers 5 and entered into the phasing circuits 6. Carrier signals fm1–fm4 whose phases are differently shifted for the individual groups of the ultrasonic transducer elements 10 are also entered into the phasing circuits 6. It is possible to compensate for pitching and rolling of the vessel (swing motion of the transducer 1) by varying the phases of the carrier signals fm1–fm4 in this fashion. This makes it possible to produce a receiving beam rotationally symmetric about a vertical axis and simplify connections between such circuit elements as the carrier generating circuits 41 and mixers 6.

Figure 5:
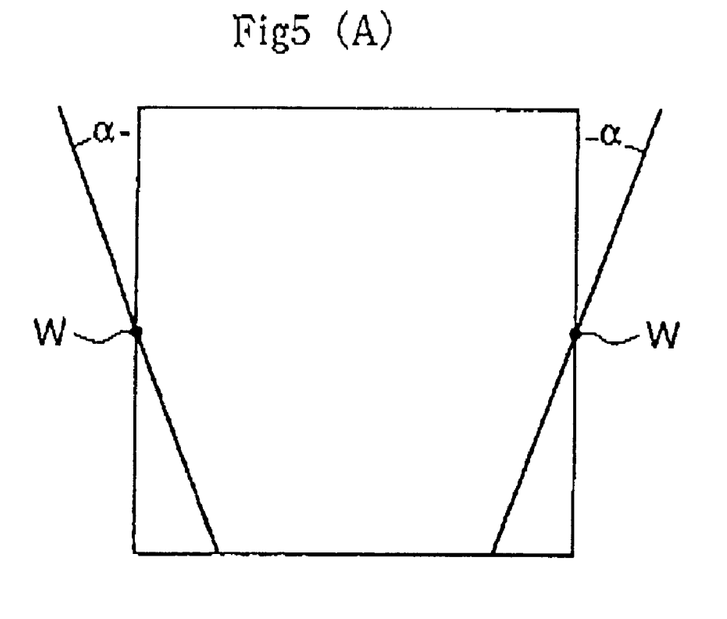
FIGS. 5A and 5B are diagrams showing how the tilt angle of a beam is controlled in the ultrasonic fish-finding apparatus of the invention.

FIGS. 5A and 5B are diagrams showing how the tilt angle of a beam is controlled depending on swing angle b, or the angle b of inclination, of the transducer 1 due to the pitching and rolling of the vessel. If the as of the transducer 1 is vertical with the vessel held in a horizontal position, it is possible to form a transmitting (receiving) beam having a full-circle umbrellalike pattern directed obliquely downward by a tilt angle a by tilting the beam at the same tilt angle a in all directions around the transducer 1 as shown in FIG. 5A. If the vessel (transducer 1) is inclined by the swing angle b in a particular direction, however, the tilt angle of the beam formed by the vertical transducer array in that direction should be set to α−β and the tilt angle of the beam formed by the vertical transducer array in the opposite direction should be set to α+β. The transducer arrays between these two vertical transducer arrays located in the opposite directions should be controlled to create tilt angles between α−β, and α+β in incremental steps according to the order of the vertical transducer arrays in their cylindrical arrangement. The tilt angles of the beam are controlled for the individual groups to which the vertical transducer arrays belong.

Figure 6:
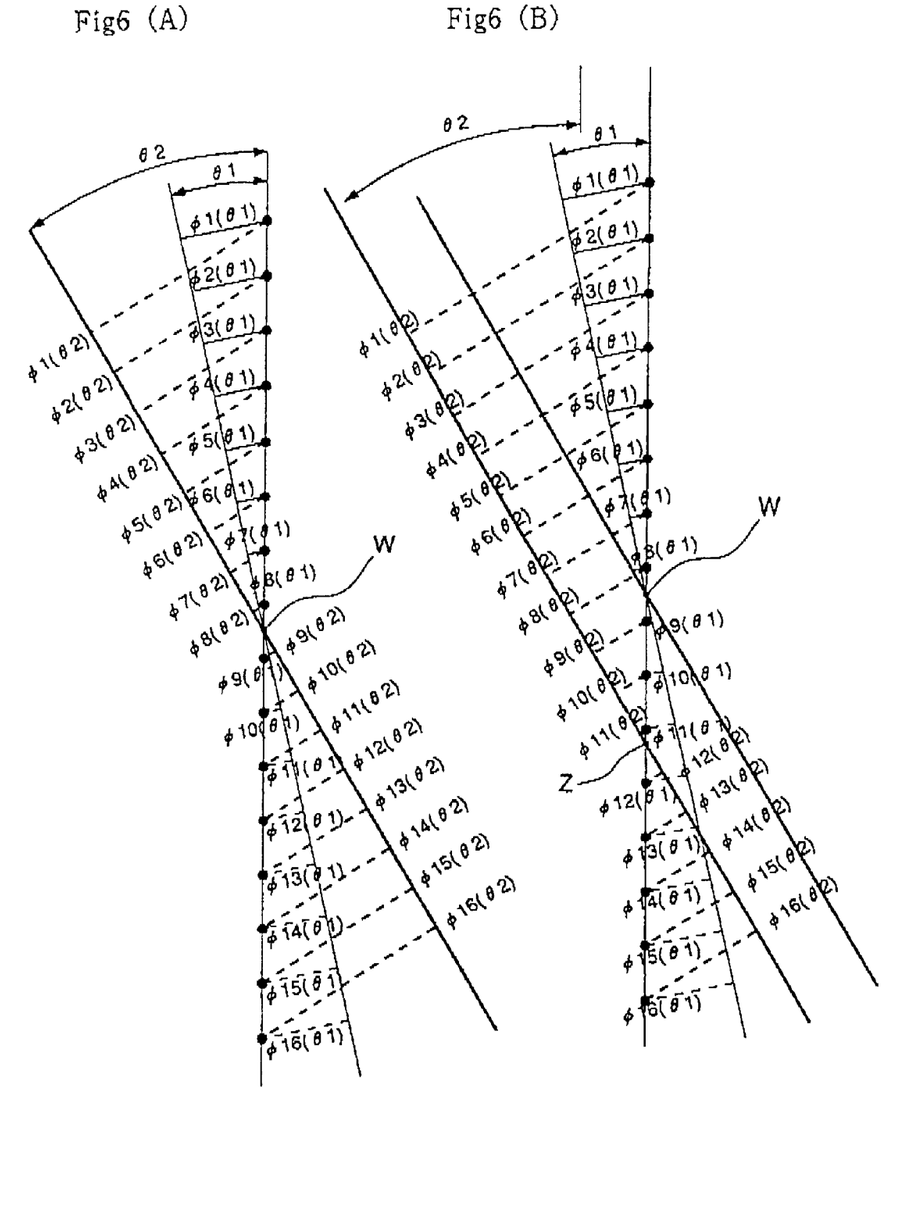

The tilt angle is controlled by varying the phases of carrier signals supplied to the ultrasonic transducer elements 10 in the individual rows of the transducer 1. Whatever the desired tilt angle is, a transducer array surface is rotated about its "center of gravity W" by the aforementioned phased array technique as illustrated in FIG. 6A, where the center of gravity of the transducer array surface is a point where a plurality of signals applied to individual elements of an array are regarded as being received at that point by combination of the signals. In combining the signals by the phased array technique, the individual signals are usually weighted symmetrically about the physical center of the array, in which the physical center of the array matches the center of gravity of the array surface. If weighting factors have asymmetrical values, the center of gravity of the array surface exists at a point of weighted means of the weighting factors. While the phases of carrier signals supplied to the ultrasonic transducer elements 10 in the individual rows of the transducer 1 are controlled such that the transducer array surface is rotated about its center of gravity W in the case of FIG. 6A, the center of rotation of the array surface is not limited to the center of gravity W. If the transducer array surface is rotated about a point Z different from the center of gravity W as shown in FIG. 6B, for example, phase discontinuity foff occurs in received signals. This would result in inability to form a proper receiving beam or cause noise.

Although the duration of each transmitting pulse is extremely short, reception of return echoes is a process which takes a period of approximately 4 seconds at a maximum and pitch and roll angles of the vessel (transducer 1) vary during this period. It is therefore necessary to controllably rotate the transducer army surface (or vary the tilt angle a) of each transducer array during reception of the return echoes. If the transducer army surface is rotated about its center of gravity W, continuity of the phase of the received echo signals is maintained. If the transducer array surface is rotated about a point Z different from the center of gravity W as shown in FIG. 6B, however, the phase of the received echo signals is interrupted.

To avoid this inconvenience, the phase output circuits 30 control signal phases such that the transducer array surface of each transducer array is rotated about the center of gravity W no matter to which tilt angle a the transmitting and receiving beams produced by the individual transducer arrays is controlled.

Figure 7:
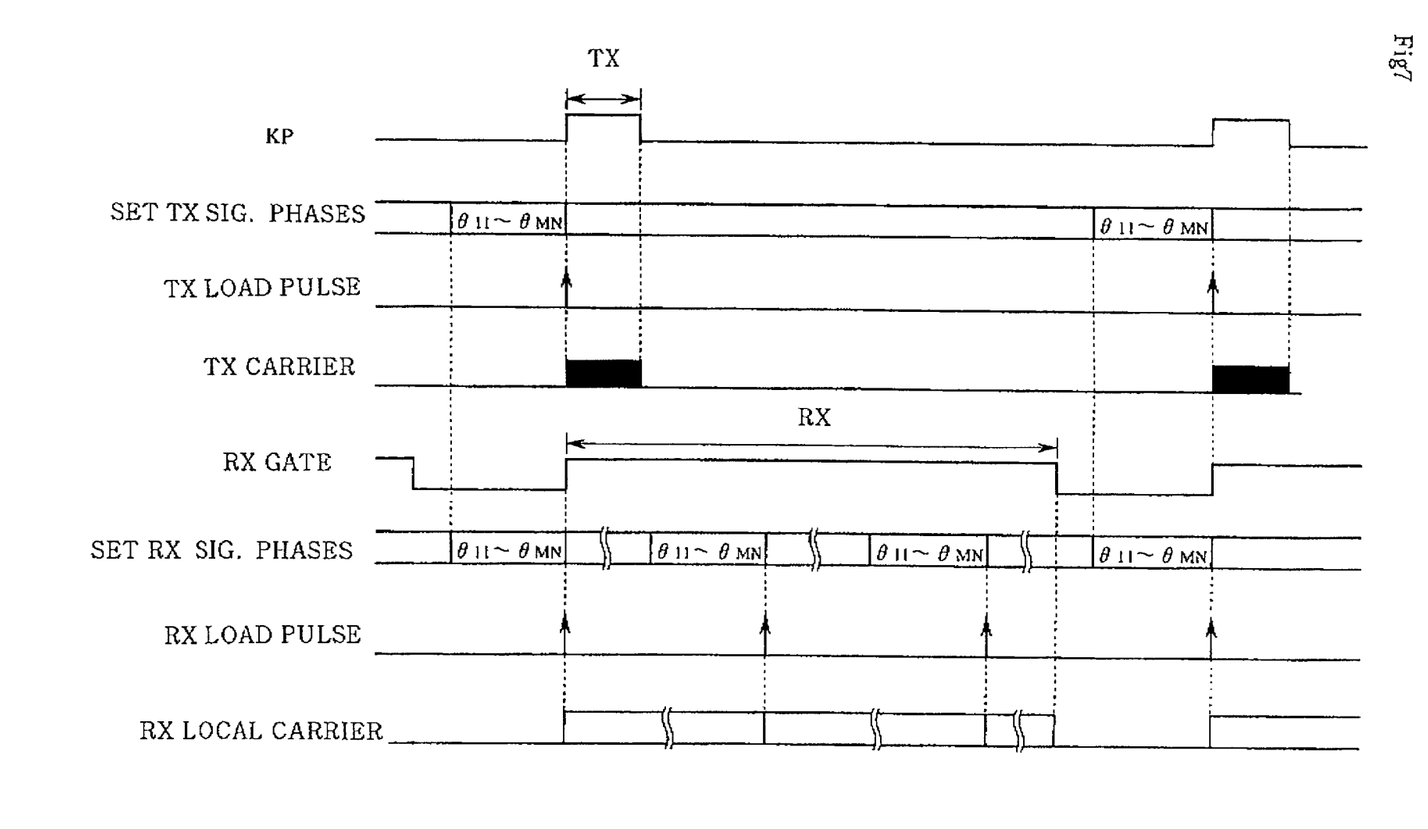
FIG. 7 is a timing chart showing the operation of the ultrasonic fish-finding apparatus of the invention.
Figure 8:
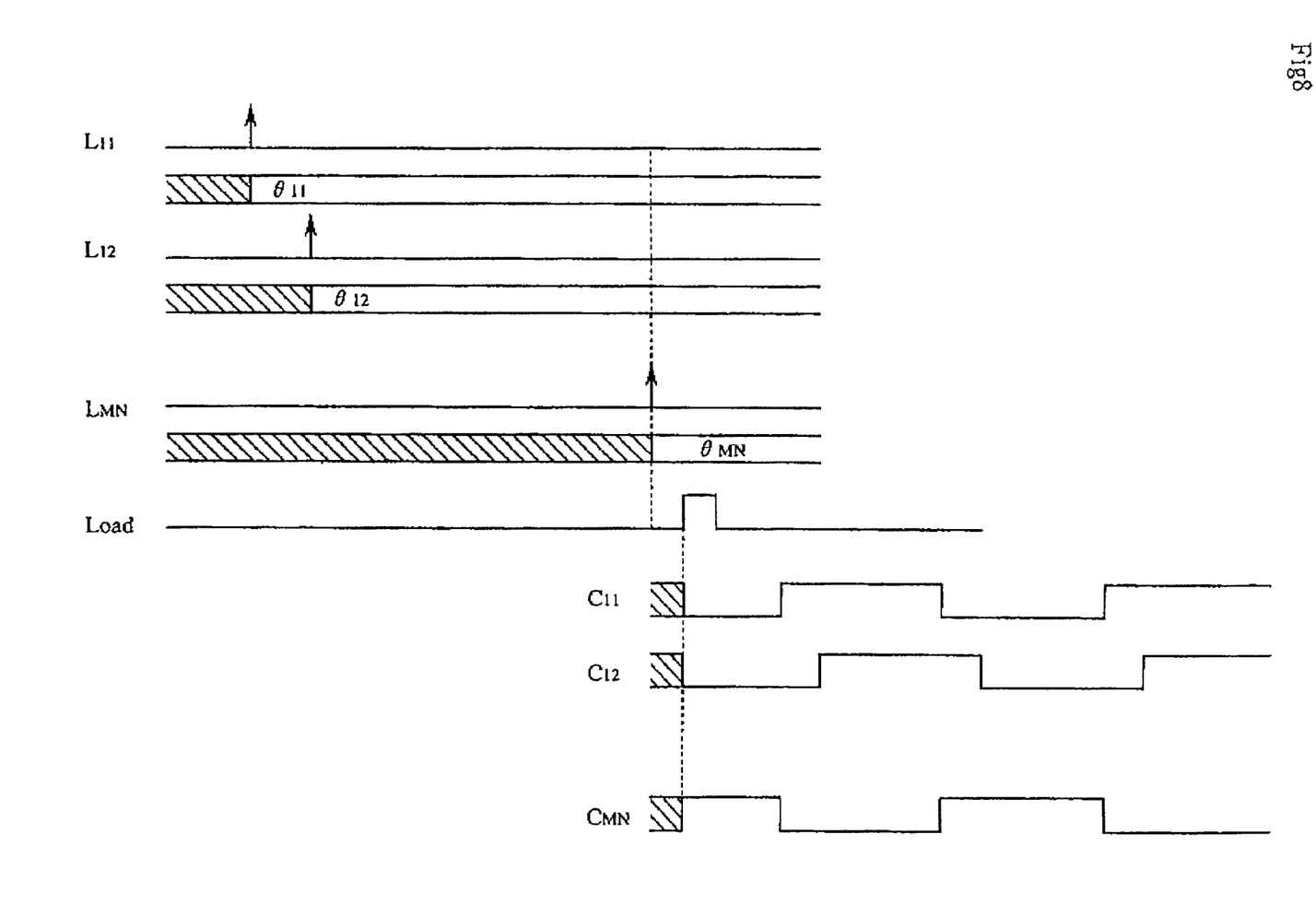
FIG. 8 is another timing chart showing the operation of the ultrasonic fish-finding apparatus of the invention.

FIGS. 7 and 8 are diagrams timing charts showing the operation of the ultrasonic fish-finding apparatus of the invention. Referring to FIG. 7, carrier phase data q(m, g) are set in the latch circuits 43 of the carrier generating circuits 41 of the individual transmitting carrier generators 2 and receiving carrier generators 7 before the ultrasonic fish-finding apparatus starts sounding operation. The carrier phase data q (m, g), starting from q(1, 1) and ending with q(20, 4), are sequentially set for the individual ultrasonic transducer elements 10 as illustrated in FIG. 8. When the setting of the carrier phase data q(m, g) has been completed, a transmission load pulse and a reception load pulse are generated, causing the individual carrier generating circuits 41 to generate carrier signals of specific phases as shown in FIG. 7. The carrier signals produced by the individual carrier generating circuits 41 have the same frequency but their phases are differently shifted as shown in FIG. 8. The carrier generating circuits 41 of the individual transmitting carrier generators 2 continuously generate the carrier signals while a transmission keying pulse (KP) is ON (for approximately one second). As soon as the reception load pulse is generated, a reception gate signal becomes ON and, as a consequence, each receiving carrier generator 7 generates the carrier signal to be supplied to the phasing circuit 6.

In the present embodiment, the carrier phase data q(m, g) are set and loaded more than once in accordance with pitching and rolling motions of the vessel during each reception cycle to compensate for variations in the vessel's pitching and rolling angles.

Although the ultrasonic fish-finding apparatus is provided with the swing motion sensor 21 and controls the direction of the transmitting and receiving beams based on detection values of the swing motion sensor 21 to maintain a beam pattern rotationally symmetric about the vertical axis regardless of the pitching and rolling motions of the vessel (transducer 1) in this embodiment, the invention is not limited to this beam direction control method.

As an alternative, a full-circle beam inclined at varying tilt angles around the vertical axis may be formed instead of controlling the direction of the beam to create a beam pattern rotationally symmetric about the vertical axis by compensating for the pitching and rolling angles of the vessel (transducer 1) as described above.

Furthermore, although the foregoing embodiment employs the transducer 1 having a complete cylindrical shape whose top and bottom have the same diameter, it is possible to employ a transducer having the shape of a truncated circular cone whose top and bottom have different diameters and conical outer surface is directed obliquely downward to produce a predetermined tilt angle. The cylindrical structure of the transducer as claimed in the appended claims includes not only a circular cylinder but also truncated circular cones as well as vertically stacked ringlike arrays of ultrasonic transducer elements.

Moreover, if the ultrasonic fish-finding apparatus is designed such that the aforementioned functions of the transmitting carrier generators 2, the receiving carrier generators 7 and the phasing circuits 6 are all performed by a digital signal processor (DSP) or a central processing circuit (CPU), it would be possible to vary the grouping of the ultrasonic transducer elements 10 whenever it is so desired.

What is claimed is:

1. A method of controlling the direction of a transmitting beam and a receiving beam formed by a cylindrical transducer which is constructed of a plurality of ultrasonic transducer arrays arranged in a circular form, said method comprising the steps of:

dividing the ultrasonic transducer arrays in a plurality of groups; and controlling the direction of the beams formed by the ultrasonic transducer arrays depending on which group the individual ultrasonic transducer arrays belong, wherein said step of controlling the direction of the beams includes the steps of:

detecting the angle of inclination of the cylindrical transducer; and controlling the direction of the beams formed by the ultrasonic transducer arrays of the individual groups to compensate for the angle of inclination of the cylindrical transducer, and controlling the receiving beam more than once during a reception cycle and the direction of the receiving beam is rotated about a fixed point.

2. The method of claim 1, wherein said controlling the direction of the beams includes controlling the direction of the beams formed by the cylindrical transducer by controlling phases of the signals emitted/received from each group.

3. The method of claim 2, wherein said controlling phases includes controlling phases by selecting phase data values for elements within a particular row and group of the transducer.

4. An apparatus for controlling the direction of a transmitting beam and a receiving beam formed by a cylindrical transducer which is constructed of a plurality of ultrasonic transducer arrays arranged in a circular form, the ultrasonic transducer arrays being divided into a plurality of groups, said apparatus comprising:

a controller for controlling the direction of the beams formed by the ultrasonic transducer arrays depending on which group the individual ultrasonic transducer arrays belong, wherein said controller includes means for controlling the phases of carrier signals fed into individual elements of the ultrasonic transducer arrays depending on which group the ultrasonic transducer arrays belong, where said controller controls the direction of the beams formed by the ultrasonic transducer arrays of the individual groups to compensate for the angle of inclination of the cylindrical transducer, and controls the direction of the receiving beam more than once during a reception cycle and rotates the direction of the receiving beam about a fixed point.

5. The apparatus of claim 4, wherein said controller to control the direction of the beams formed by the cylindrical transducer by controlling phases of the signals emitted/received by each group.

6. The apparatus of claim 5, wherein said controller to control phases by selecting phase data values for elements within a particular row and group of the transducer.

* * * * *